United States Patent
Jones et al.

(10) Patent No.: US 7,330,481 B2
(45) Date of Patent: Feb. 12, 2008

(54) HIGHLY CHANNELIZED PORT POLLING IN A TELECOMMUNICATIONS SWITCH

(75) Inventors: John P. Jones, Westford, MA (US); Donald W. Ives, Lexington, MA (US)

(73) Assignee: Ciena Corporation, Linthicum, MD (US)

(*) Notice: Subject to any disclaimer, the term of this patent is extended or adjusted under 35 U.S.C. 154(b) by 1010 days.

(21) Appl. No.: 10/214,466

(22) Filed: Aug. 7, 2002

(65) Prior Publication Data

US 2003/0043841 A1    Mar. 6, 2003

Related U.S. Application Data

(60) Provisional application No. 60/316,587, filed on Aug. 31, 2001.

(51) Int. Cl.
*H04L 12/403* (2006.01)

(52) U.S. Cl. .................. 370/449; 370/346; 710/46

(58) Field of Classification Search ............ 370/450, 370/453, 455; 710/44, 46
See application file for complete search history.

(56) References Cited

U.S. PATENT DOCUMENTS

| | | | |
|---|---|---|---|
| 4,768,030 A | 8/1988 | Frederich | 340/825.06 |
| 4,873,681 A | 10/1989 | Arthurs et al. | 370/3 |
| 4,962,498 A | 10/1990 | May, Jr. | 370/94.1 |
| 4,979,165 A | 12/1990 | Dighe et al. | 370/60 |
| 5,001,706 A | 3/1991 | Dighe et al. | 370/94.1 |
| 5,003,535 A | 3/1991 | May, Jr. et al. | 370/94.1 |
| 5,020,054 A | 5/1991 | May, Jr. | 370/94.1 |
| 5,020,055 A | 5/1991 | May, Jr. | 370/94.1 |
| 5,025,486 A | 6/1991 | Klughart | 455/54 |
| 5,042,032 A | 8/1991 | Dighe et al. | 370/94.1 |
| 5,301,323 A * | 4/1994 | Maeurer et al. | 718/105 |
| 5,359,602 A * | 10/1994 | Diaz et al. | 370/401 |
| 5,416,777 A | 5/1995 | Kirkham | 370/85.8 |
| 5,457,689 A * | 10/1995 | Marvit et al. | 370/449 |
| 5,524,267 A | 6/1996 | Chin et al. | 395/823 |
| 5,559,955 A | 9/1996 | Dev et al. | 395/182.02 |
| 5,628,686 A | 5/1997 | Svancarek et al. | 463/36 |
| 5,680,425 A * | 10/1997 | Morzano | 377/26 |
| 5,724,558 A | 3/1998 | Svancarek et al. | 395/500 |
| 5,751,933 A | 5/1998 | Dev et al. | 395/182.02 |
| 5,790,855 A | 8/1998 | Faustini | 395/701 |
| 5,812,750 A | 9/1998 | Dev et al. | 395/182.02 |
| 5,822,304 A * | 10/1998 | Brody et al. | 370/248 |
| 5,841,771 A * | 11/1998 | Irwin et al. | 370/360 |
| 5,862,338 A * | 1/1999 | Walker et al. | 709/224 |
| 5,926,476 A * | 7/1999 | Ghaibeh | 370/395.65 |
| 6,049,828 A | 4/2000 | Dev et al. | 709/224 |

(Continued)

*Primary Examiner*—Chi Pham
*Assistant Examiner*—Kevin Mew
(74) *Attorney, Agent, or Firm*—Clements Walker; Christopher L. Bernard; Tyler S. Brown

(57) ABSTRACT

A method of telecommunication network switch port polling enables very highly channelized ports to be polled. A polling engine reads information from at least one of a plurality of poll registers, and each of the plurality of poll registers is associated with a unique identifier. Depending on the information read from the at least one poll register, the polling engine reads a channel number representing the channel to be polled from a location in channel memory. The polling engine determines the location from the unique identifier associated with the at least one poll register from which the information is read. The polling engine polls channel represented by the read channel number.

8 Claims, 7 Drawing Sheets

U.S. PATENT DOCUMENTS

| | | | |
|---|---|---|---|
| 6,055,619 A | 4/2000 | North et al. | 712/36 |
| 6,079,034 A * | 6/2000 | VanZante et al. | 714/48 |
| 6,098,142 A | 8/2000 | Leggett et al. | 710/220 |
| 6,240,070 B1 | 5/2001 | Kozdon et al. | 370/260 |
| 6,771,655 B1 * | 8/2004 | O'Loughlin et al. | 370/449 |
| 2002/0163930 A1 * | 11/2002 | Kreider et al. | 370/449 |

* cited by examiner

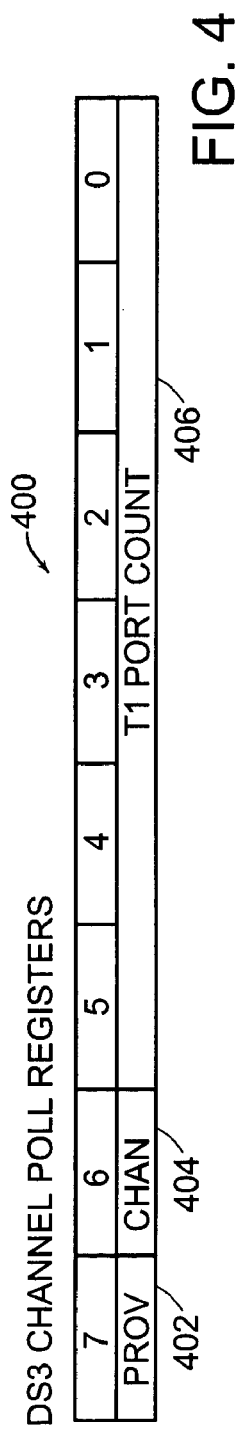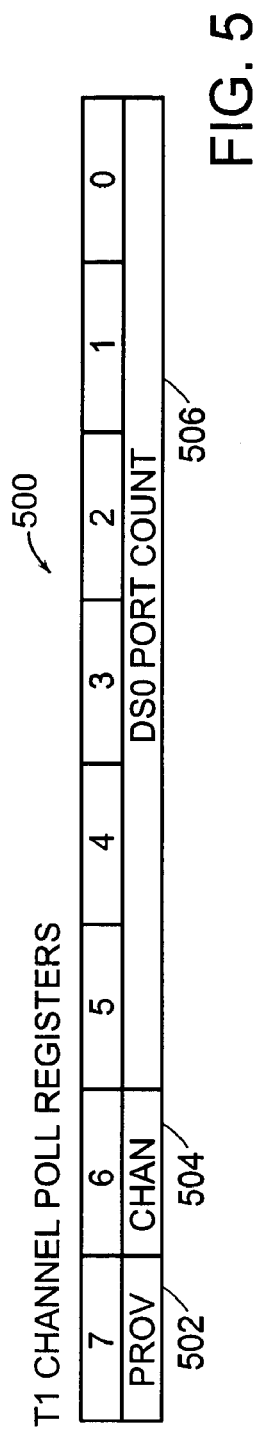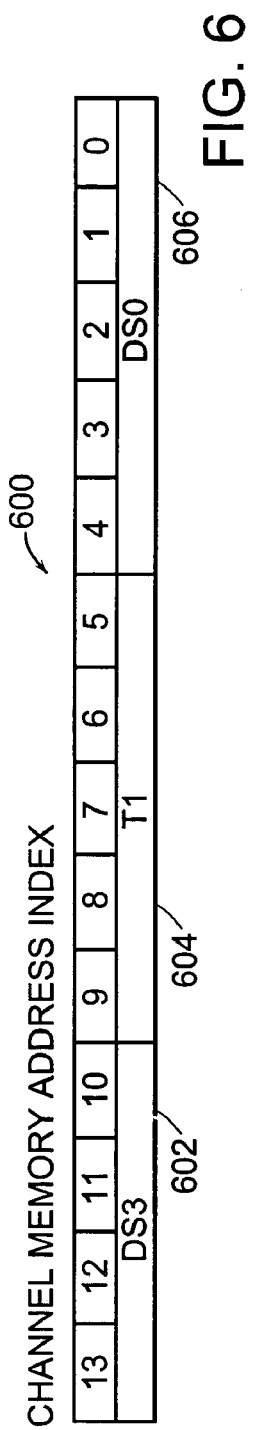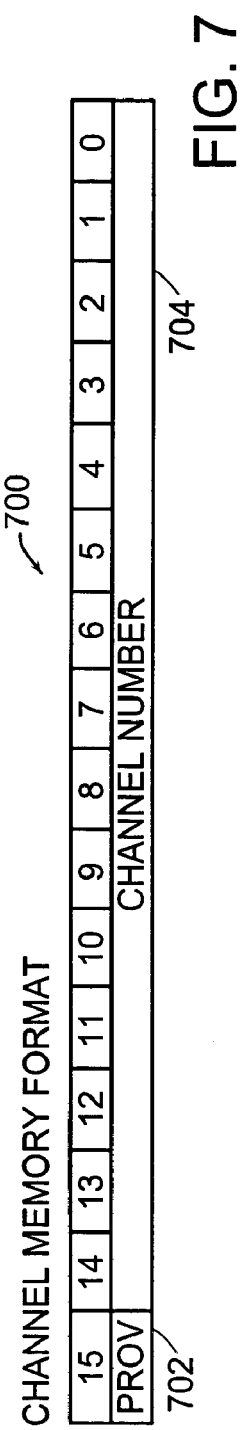

| Address | Channel Number |
|---|---|
| 0x0000 | Prov Bit; Channel Number (DS3-0, T1-0, DS0-0) |
| 0x0001 | Prov Bit; Channel Number (DS3-0, T1-0, DS0-1) |
| ... | ... |
| 0x0017 | Prov Bit; Channel Number (DS3-0, T1-0, DS0-23) |
|  | Unused |
| 0x0020 | Prov Bit; Channel Number (DS3-0, T1-1, DS0-0) |
| 0x0021 | Prov Bit; Channel Number (DS3-0, T1-1, DS0-1) |
| ... | ... |
| 0x0037 | Prov Bit; Channel Number (DS3-0, T1-1, DS0-23) |
|  | Unused |
|  | ... |
| 0x0377 | Prov Bit; Channel Number (DS3-0, T1-27, DS0-23) |
|  | Unused |
| 0x0400 ... 0x0777 | Prov Bits; Channel Numbers (DS3-1, T1[0-27], DS0[0-23]) |
| 0x0800 ... 0x0B77 | Prov Bit; Channel Number (DS3-2, T1-0, DS0) Prov Bits; Channel Numbers (DS3-2, T1[0-27], DS0[1-23]) |
| 0x0C00 ... 0x0F77 | Prov Bits; Channel Numbers (DS3-3, T1[0-27], DS0[0-23]) |
| 0x1000 ... 0x1377 | Prov Bits; Channel Numbers (DS3-4, T1[0-27], DS0[0-23]) |
| 0x1400 ... 0x1777 | Prov Bits; Channel Numbers (DS3-5, T1[0-27], DS0[0-23]) |
| 0x1800 ... 0x1B77 | Prov Bits; Channel Numbers (DS3-6, T1[0-27], DS0[0-23]) |
| 0x1C00 ... 0x1F77 | Prov Bits; Channel Numbers (DS3-7, T1[0-27], DS0[0-23]) |
| 0x2000 ... 0x2377 | Prov Bits; Channel Numbers (DS3-8, T1[0-27], DS0[0-23]) |
| 0x2400 ... 0x2777 | Prov Bits; Channel Numbers (DS3-9, T1[0-27], DS0[0-23]) |
| 0x2800 ... 0x2B77 | Prov Bits; Channel Numbers (DS3-9, T1[0-27], DS0[0-23]) |
| 0x2C00 ... 0x2DC6 0x2F77 | Prov Bits; Channel Numbers (DS3-11, T1[0-13], DS0[0-5]) Prov Bit; Channel Number (DS3-11, T1-14, DS0-6) Prov Bits; Channel Numbers (DS3-11, T1[15-27], DS0[7-23]) |

FIG. 8

HIGHLY CHANNELIZED PORT POLLING IN A TELECOMMUNICATIONS SWITCH

CROSS REFERENCE TO RELATED APPLICATIONS

This claims priority to and the benefit of Provisional U.S. patent application Ser. No. 60/316,587 filed Aug. 31, 2001, the entirety of which is hereby incorporated by reference.

TECHNICAL FIELD

The invention relates generally to telecommunications and more specifically to polling ports of a telecommunications device.

BACKGROUND INFORMATION

A telecommunications switch is a network device that provides a common connection point for other network devices, such as other switches (local, tandem, and/or point of presence switches), routers, clients, and servers, for example. The switch transmits and receives packets of information (packets), such as cells, frames, and/or datagrams, for example, that are transferred between the other network devices connected to the switch. The switch, in response to receiving a packet through an input port, reads a destination address from the packet and then forwards the packet to an output port associated with the destination address.

Typically, to determine if there are packets at an input port waiting to be transferred to an output port, a polling engine, such as a processor, in the switch periodically polls (reads) each input port. Further, the polling engine also periodically polls each output port to determine if there is space available to receive packets waiting at the input ports. A typical method of polling ports in a telecommunication switch involves using two entry tables stored in a memory. One table is an active table and the other table is an update table. Both the active table and the update table include channel numbers that correspond to the ports of the switch that the polling engine polls. The rate at which the polling engine polls a particular port (i.e., channel rate) is determined by the number of times the particular port's corresponding channel number appears in the active and update tables. The polling engine (processor) sequentially reads through the active table and polls each port in the order that each port's corresponding channel number appears in the active table. Enabling or disabling a particular port, or changing a particular port's channel rate involves the polling engine writing to every location in the update table that the particular port's corresponding channel number appears. After the polling engine updates the update table, (e.g., rate change, port enable, or port disable) the update table becomes the active table and the former active table becomes the new update table. The polling engine then sequentially reads each port's corresponding channel number from the new active table. The polling engine then polls each port in the order that each port's corresponding channel number appears in the new active table. If none of the ports are updated, the polling engine continues to read from the currently active table.

SUMMARY OF THE INVENTION

The channel polling method of the present invention matches a channel's polling rate to the channel's relative bandwidth, thereby increasing the number of channels that can be serviced. The channel polling method requires less memory than existing channel polling methods. As a result, systems and devices using the channel polling method of the present invention are less expensive, are smaller, and consume less power. Further, systems using the channel polling method require less processor interaction, which reduces channel enabling and disabling rates.

In one aspect, the invention involves a method for polling ports of a telecommunications device. The method includes reading information from one of a plurality of poll registers where each of the plurality of poll registers corresponds to one of the ports and is associated with a unique identifier. The method further includes reading, depending on the information read from the poll register, a channel number representing the port to be polled from a location in channel memory. The location is determined from the unique identifier associated with the poll register from which the information is read. The method still further includes polling the port represented by the read channel number.

According to one feature, reading information from the one of the plurality of registers includes reading a provision bit. In one embodiment, reading information from the one of the plurality of poll registers includes reading a channel bit in response to the provision bit indicating that the port corresponding to that poll register is provisioned. In another embodiment, reading information from the one of the plurality of poll registers includes reading a port count associated with another one of the plurality of poll registers in response to the channel bit indicating that the port is channelized. According to another feature, a provision bit is read from the location in channel memory determined from the unique identifier. In one embodiment, polling the channel represented by the read channel number occurs in response to the provision bit read from the location in channel memory indicating that the port is provisioned. According to still another feature, reading information from the one of the plurality of poll registers includes reading a port count associated with another one of the plurality of poll registers in response to a provision bit indicating that the port is provisioned and a channel bit indicating that the port is channelized. In one embodiment, reading the channel number includes reading the channel number and an associated channel memory provision bit from a location in channel memory determined from the port count and the unique identifier associated with the poll register in response to a channel bit indicating that the port is channelized. According to still another feature, polling the channel represented by the read channel number includes polling the channel represented by the read channel number in response to an associated provision bit from the location in channel memory indicating that the port is provisioned. According to another feature, reading the channel number includes reading the channel number and an associated provision bit from the location in channel memory determined from the unique identifier associated with the poll register in response to a channel bit indicating that the port is not channelized.

In another aspect, the invention involves a method for enabling polling of a port of a telecommunications device. The method includes writing a first value to a location in channel memory. The first value identifies a port to be polled. The method further includes writing a second value to a register associated with the port to be polled. The second value enables access to the location in the channel memory from which the first value can be retrieved in order to poll the port.

According to one feature, writing a first value to a location in channel memory includes setting a channel memory provision bit and writing a channel number to the channel memory at the location. According to another feature, writing a second value to the register associated with the port to be polled includes writing a register provision bit and a register channel bit to the register.

In yet another aspect, the invention involves a method for disabling polling of a port of a telecommunications device. The method includes writing a channel number at a location in channel memory that identifies a port that is provisioned for polling and writing a value to a register associated with the port. The written value disables access to the location of the channel number stored in channel memory thereby disabling polling of the port. According to one feature, writing a value to the register includes writing a register provision bit.

In still another aspect, the invention involves a telecommunications device having a plurality of ports. The ports are a plurality of types and each type of port handles network data at a different bandwidth than the other types of ports. The telecommunications device includes channel memory organized by channel addresses. The channel memory at each channel address stores a channel number that corresponds to one of the ports. The telecommunications device further includes a plurality of registers. Each of the plurality of registers is associated with a type of port. The telecommunications device further includes a processor for determining a particular one of the ports to be polled by deriving a channel address from at least one of the registers and obtaining a channel number of the particular port from the channel memory located at the derived channel address.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 4 is an illustrative diagram of an embodiment of a DS3 channel poll register, according to one embodiment of the invention.

FIG. 5 is an illustrative diagram of an embodiment of a T1 channel poll register, according to one embodiment of the invention.

FIG. 6 is an illustrative diagram of an embodiment of a channel memory address index structure, according to one embodiment of the invention.

FIG. 7 is an illustrative diagram of an embodiment of a channel memory format, according to one embodiment of the invention.

FIG. 8 is an illustrative diagram of an embodiment of an organization of a channel memory structure, according to one embodiment of the invention.

DESCRIPTION

Figure 1:
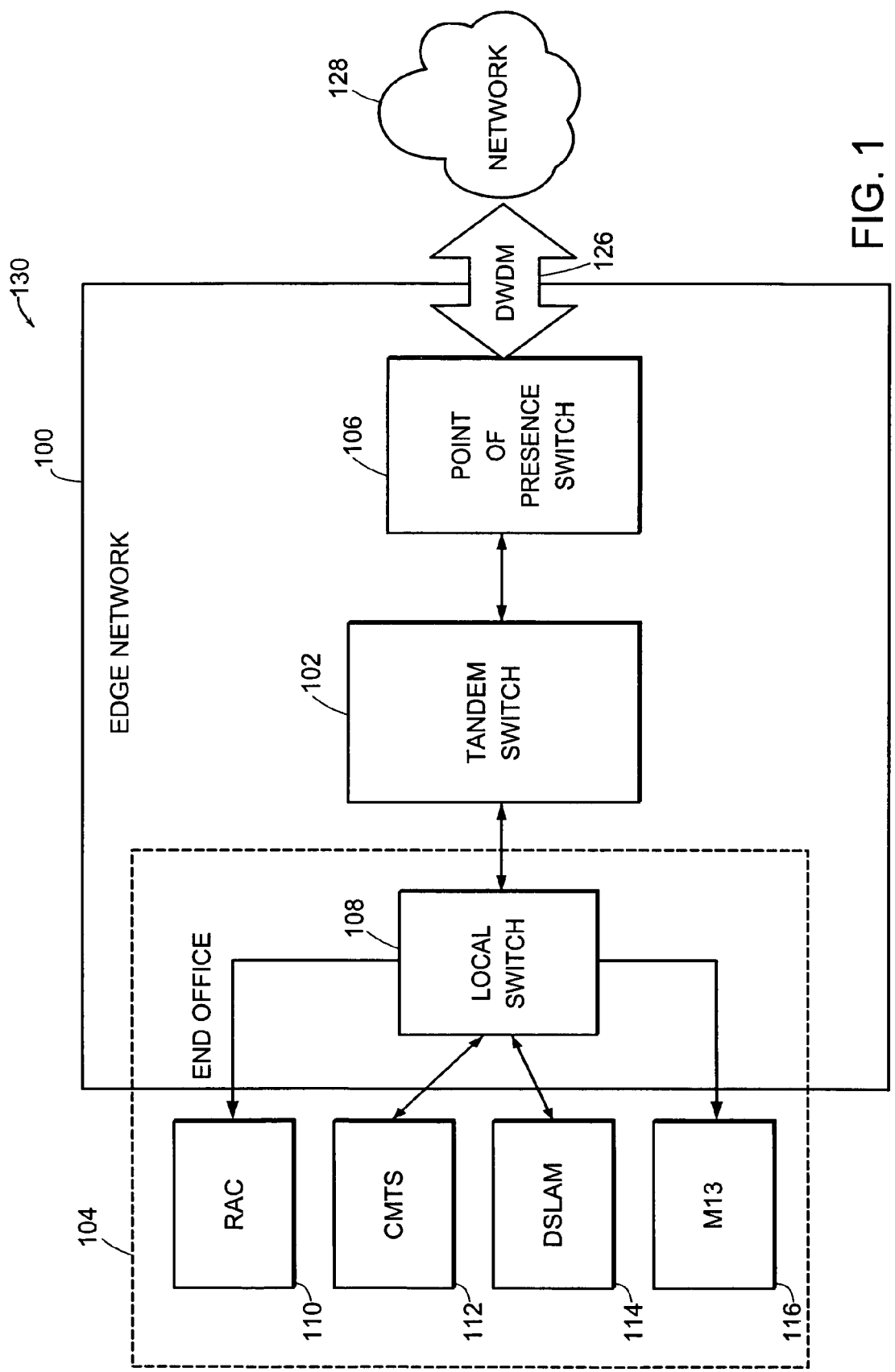
FIG. 1 is an illustrative block diagram of an embodiment of a telecommunication network, according to one embodiment of the invention.

A telecommunication switch in a network provides a common connection point for network devices, such as other switches, routers, clients, and servers. For example, FIG. 1 shows an embodiment of a network 130 embodying the principles of the invention. The network 130 includes an edge network 100 and a core network 128. The edge network 100 includes an end office 104, a tandem switch 102, and a Point of Presence (POP) switch 106. The end office 104 includes a local switch 108, a routing and access controller (RAC) 110, a cable modem termination system (CMTS) 112, a digital subscriber line access multiplexor (DSLAM) 114, and an E1/T1/DS3 multiplexor (M13) 116. The RAC 110, DSLAM 114, CMTS 112, and M13 116 are each in communication with the local switch 108 and transmits/receives packets of information (packets), such as cells, frames, and/or datagrams, to/from the local switch 108. The local switch 108 transmits/receives packets to/from the tandem switch 102. The tandem switch 102 transmits/receives packets to/from the POP switch 106. The POP switch 106 is a gateway for packets, via a dense wave division multiplexor (DWDM) optical backbone 126, to/from the core (main) network 128.

Figure 2:
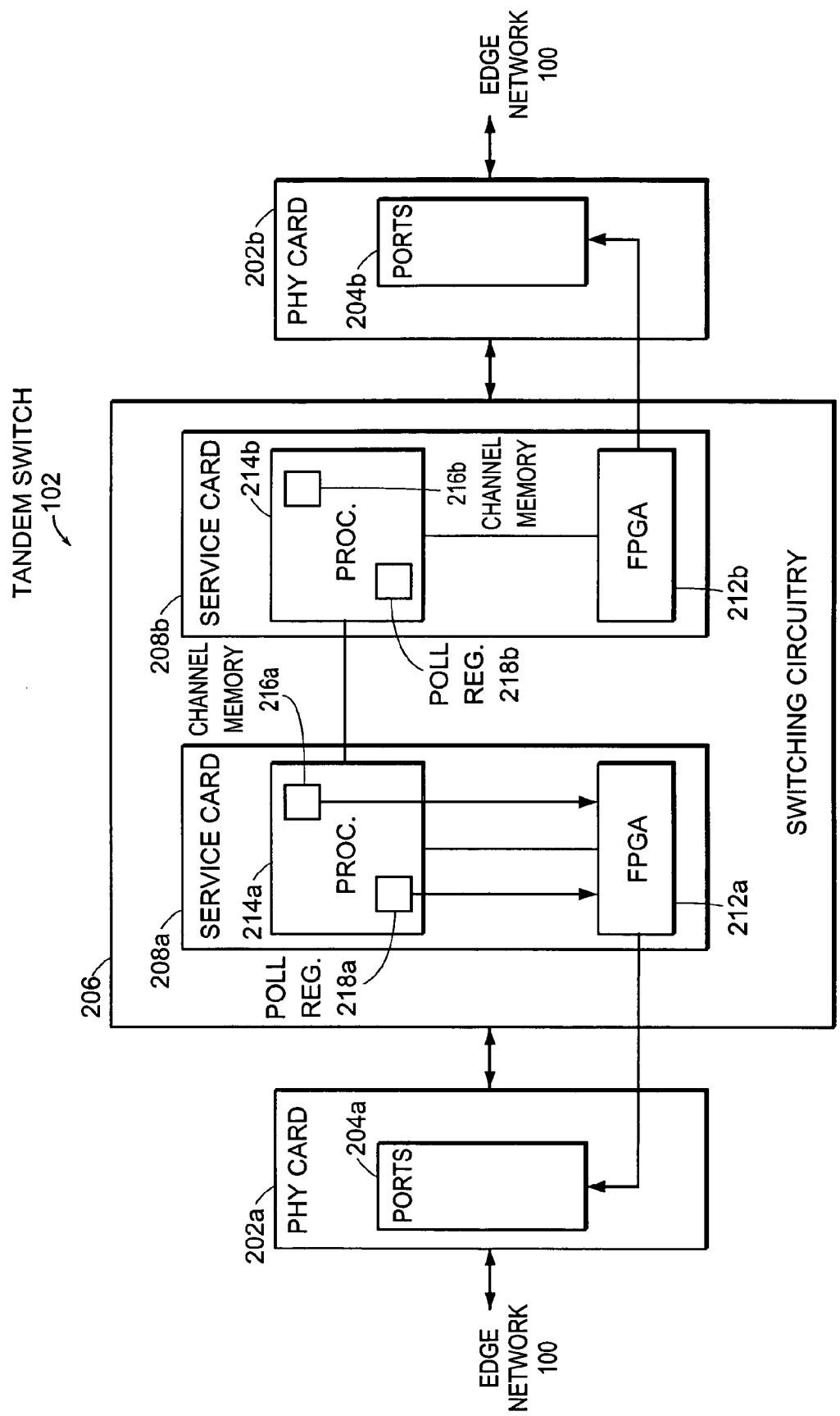
FIG. 2 is an illustrative block diagram of an embodiment of a telecommunications switch, according to one embodiment of the invention.

FIG. 2 shows an illustrative block diagram of an embodiment of the switch 102. Generally, the switch 102 includes physical layer adapter (PHY) cards 202a, 202b, and control, processing, and switching circuitry 206. The PHY cards 202a, 202b include I/O ports 204a and 204b, respectively. The I/O ports 204a and 204b are connected to the network 100 and include multiple port types and port densities (number of links to the network 100), such as DS3, T1, and DS0 for example.

The switching circuitry 206 includes a service card 208a (which acts a switch controller) and a service card 208b. The service cards 208a, 208b include processors 214a, 214b and FPGAs (field programmable gate arrays) 212a, 212b, respectively. The processors 214a, 214b include registers 218a, 218b and channel memories 216a, 216b, respectively (discussed in further detail below). The processor 214a and/or 214b also store and execute software including a polling routine (discussed in further detail below). In other embodiments, the registers 218a, 218b and the channel memories 216a, 216b can be external to the processors 214a, 214b.

A network device, such as the switch 102, in response to receiving a packet or packets through a particular link in the I/O ports 204a or 204b, reads a destination address from the packet and then forwards the packet to another particular link in the I/O ports 204a, 204b based on the destination address. A polling engine, such as the processor 214a, 214b executing the polling routine, periodically polls (reads) each link in the I/O ports 204a, 204b to determine if there are any packets waiting to be transferred to another link in the I/O ports 204a, 204b. Further, the processor 214a, 214b periodically polls each link in the I/O ports 204a, 204b to determine if there is space available to receive packets waiting at another link in the I/O ports 204a, 204b. A switch, or other network device, constructed in accordance with the invention enables the processors 214a, 214b to poll a large number of I/O ports 204a, 204b by matching the I/O port's 204a, 204b polling rate (rate at which the processor 214a, 214b reads the I/O ports 204a, 203b) to the I/O port's 204a, 204b bandwidth (amount of packets that the I/O port 204a, 204b transmits/receives in a fixed amount of time).

The I/O ports 204a, 204b are "physical" ports and/or "logical" ports. A physical port requires a physical connection, such as through a wire, for example. Physical ports are of a particular type. The type of port (e.g., DS3, T1, or DS0) dictates the data transfer speed, data format, wire properties, and connector type used when implementing the particular port. Each physical port is capable of being subdivided (or partitioned) into a second tier of individual logical ports. Each second tier logical port is capable of being further partitioned into a third tier of individual logical ports. Each tier of ports (physical and logical) has an associated polling rate and an associated bandwidth.

A logical port has the same data transfer speed and data format as an analogous physical port. However, logical ports do not have any physical connectors or wires because logical ports are multiplexed (carried) over a higher speed physical port. For example, in one embodiment, twenty-eight T1 logical ports are carried over one DS3 physical port. A bundled port exists when multiple ports are logically associated as a single entity (e.g., n×T1, where n=0-27).

A link is a generic term for any provisioned physical or logical port. A "provisioned" port is a physical or logical port that is enabled (by software residing on the processors 214a, 214b) to pass packets between two network devices. A "not provisioned" or "unprovisioned" port is a physical or logical port that is not enabled to pass packets between two network devices.

Provisioned physical and logical ports are channelized or unchannelized. In either case, the processor 214a and/or 214b (controlled by software residing thereon) assigns a single channel number to the physical or logical port in response to the processor 214a and/or 214b provisioning the port. The processor 214a and/or 214b use the channel number to identify the link (a physical or logical provisioned port) that receives or transmits packets. A provisioned physical or logical port that has been assigned a channel number is referred to as a channel.

If a physical or logical channel is unchannelized, the switch 102 accesses the entire bandwidth of the physical or logical channel as a single channel. If the physical or logical channel is channelized, multiple lower transfer rate channels are multiplexed (carried) over the higher transfer rate channel. The processor 214a and/or 214b assigns a separate channel number to each of the lower transfer rate channels. The processor 214a and/or 214b also identifies each of the lower transfer rate channels by the separate channel number.

Figure 3:
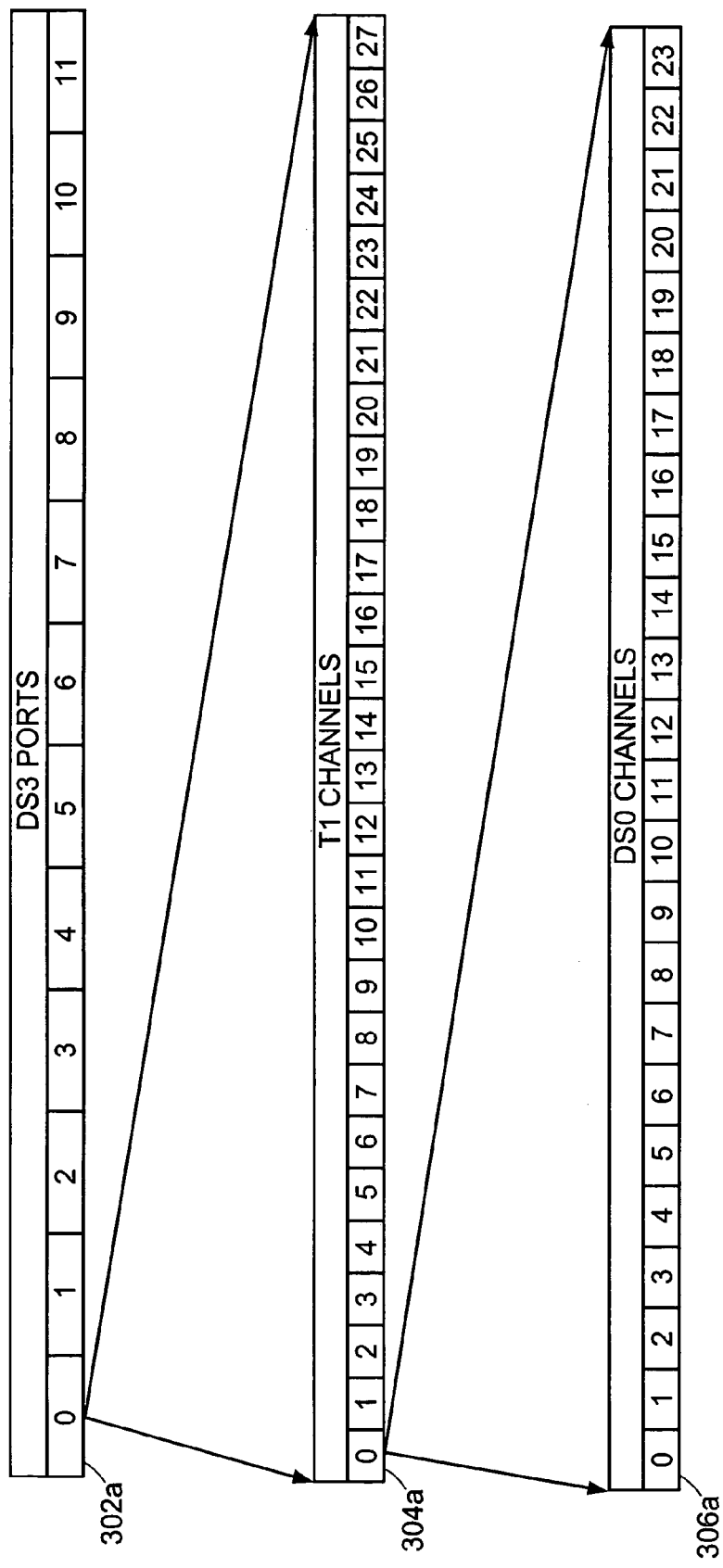
FIG. 3 is an illustrative diagram of an embodiment of a logical breakdown of DS3 physical channels, T1 logical channels, and DS0 logical channels, according to one embodiment of the invention.
Figure 9A:
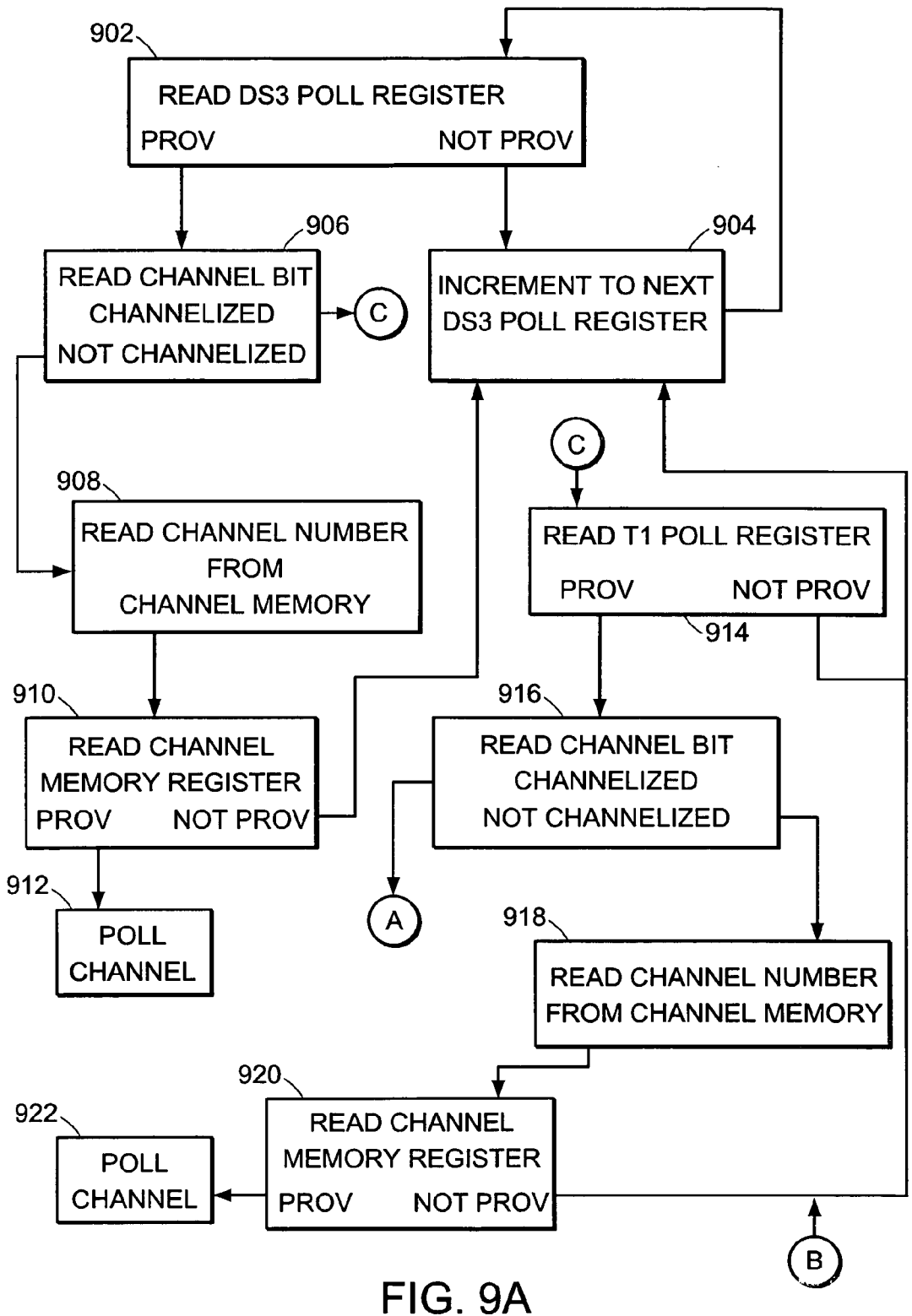
FIGS. 9A and 9B are illustrative flow diagrams of an embodiment of a process for polling highly channelized ports, according to one embodiment of the invention.
Figure 9B:
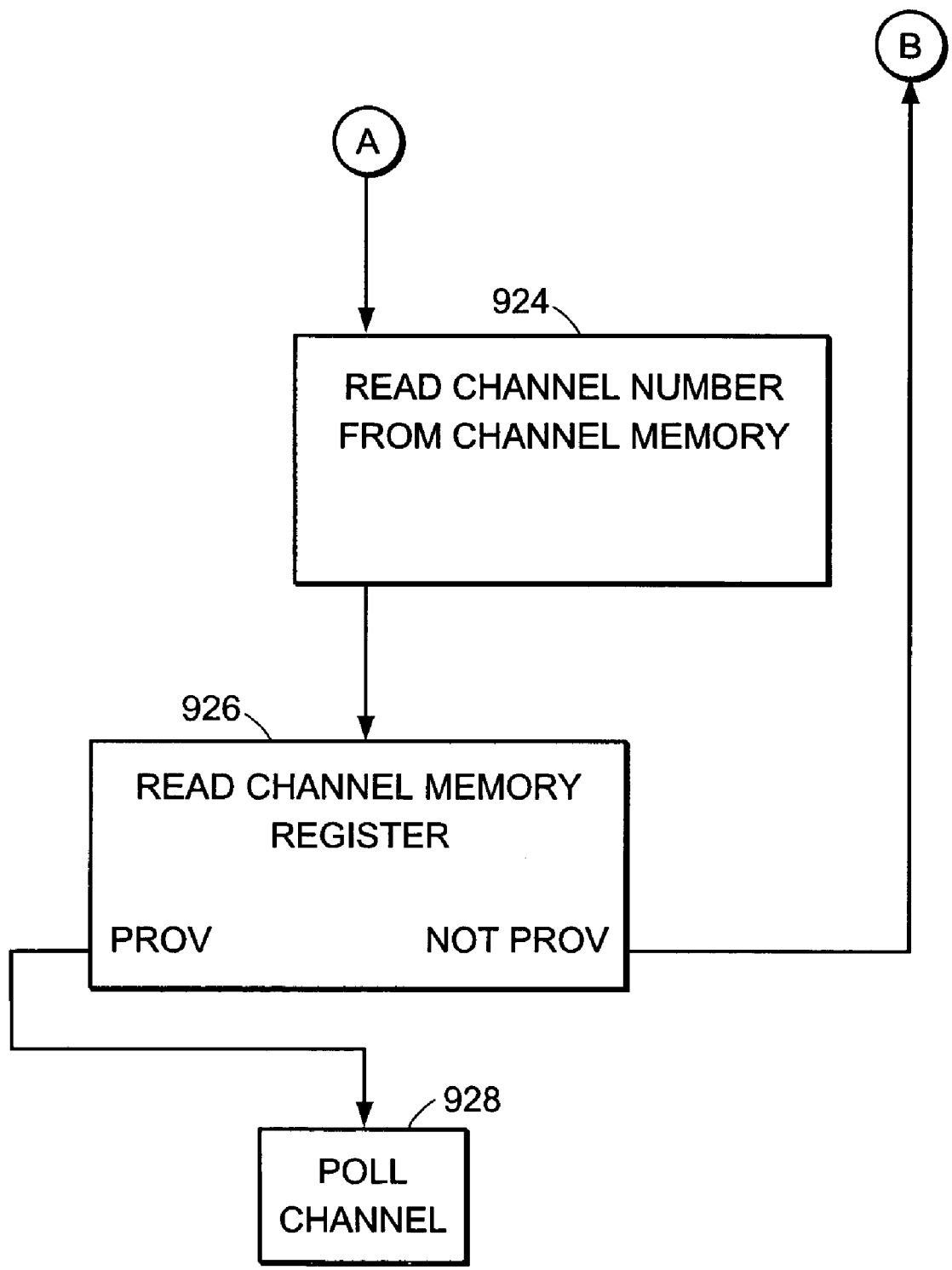

FIG. 3 shows an illustrative diagram of an embodiment of a logical breakdown of DS3 physical channels (generally 302), T1 logical channels (generally 304), and DS0 logical channels (generally 306). If a DS3 physical channel 302a is channelized, the DS3 physical channel 302a carries twenty-eight (counting from 0-27) T1 logical channels 304a-304aa. The processors 214a, 214b assign a unique channel number to each T1 logical channel 304 that is provisioned. Further, if the T1 logical channel 304a is channelized, the T1 logical channel 304a carries twenty-four (counting from 0-23) DS0 logical channels 306a-306w. The processor 214a and/or 214b assigns a unique channel number to each DS0 logical channel that is provisioned. A lower transfer rate channel (such as a T1 port) multiplexed onto a higher transfer rate channel (such as a DS3 port), is a logical channel. For example, the DS3 physical channel 302a does not include a separate physical connection for each of the twenty-eight T1 logical channels 304a-304aa. There is only one physical DS3 channel 302a connection.

In other embodiments, the DS3 channel 302 is a logical lower transfer rate channel multiplexed on a higher transfer rate channel and the DS0 logical channel 306 is partitioned (channelized) into even lower transfer rate channels.

The service card 208a controls all the switch 102 functions and processes packets that the PHY card 202a transmits/receives to/from the network 100. Similarly, the service card 208b processes packets that the PHY card 202b transmits/receives to/from the network 100. Before The PHY cards 202a, 202b transmit packets to the service cards 208a, 208b, the processors 214a, 214b poll each input channel on the I/O ports 204a, 204b by checking a data available flag according to a polling routine stored and executed on the processors 214a, 214b. The polling routine determines if an input channel (or channels) on the I/O ports 204a, 204b has a packet (or multiple packets) waiting to be processed by the service cards 208a, 208b. Further, before the PHY cards 202a, 202b receive packets from the service cards 208a, 208b, the processors 214a, 214b poll each output channel on the I/O port 204a, 204b by checking a space available flag according to the polling routine. The polling routine determines if an output channel (or channels) is available to receive a packet (or multiple packets).

The processors 214a and 214b store and execute the polling routine. The processor 214a is in communication with FPGA 212a and processor 214b. The processor 214b is also in communication with FPGA 212b. The FPGA 212a, which receives instructions from the polling routine executing on the processor 214a, polls the I/O port 204a on the PHY card 202a. Likewise, the FPGA 212b, which receives instructions from the processor 214b (which, in turn, receives instructions from the processor 214a), polls the I/O port 204b on the PHY card 202b. In another embodiment, the FPGAs 212a, 212b receive instructions directly from the processor 214a.

Referring to FIGS. 2, 4, and 5, in one embodiment, the registers 218a, 218b each include twelve DS3 channel poll registers 400 (numbered 0-11) and 336 (12 groups of 28) T1 channel poll registers 500 (numbered 0-27). Each of the twelve DS3 channel poll registers 400 is associated with a unique identifier (0-11) and includes a provision (PROV) bit 402, a channel (CHAN) bit 404, and a six bit T1 port count 406. Each of the 336 T1 poll registers 500 is associated with a unique identifier (0-27 T1 channels within each of the 12 DS3 channels) and includes a provision (PROV) bit 502, a channel (CHAN) bit 504, and a six bit DS0 port count 506. For example the unique identifier for the sixth DS3, second T1 is 0101 00001 binary. The unique identifier for the third DS3, third T1 is 001000010 binary.

FIG. 6 shows an illustrative diagram of an embodiment of a channel memory address index 600. The channel memory address index 600 includes a DS3 field 602, a T1 field 604, and a DS0 field 606. The value in the DS3 field 602 is the unique identifier for a particular DS3 channel poll register 400 (0-11). This value represents a particular DS3 channel. The value in the T1 field 604 is the unique identifier for a particular T1 channel poll register 500 (0-27). This value represents a particular T1 channel within a DS3 channel. The value in the DS0 field 606 represents a particular DS0 channel (0-23). The processors 214a, 214b combine the values in the DS3 field 602, the T1 field 604, and the DS0 field 606 to derive a channel address index. The channel address index corresponds to a location (or address) in the channel memory 216a or 216b where the processors 214a, 214b store a channel number corresponding to a particular DS3, T1, or DS0 port.

The processor 214a and/or 214b derives the channel memory address indices as follows. The DS0 field 606 represents the DS0 logical channels within a T1 logical channel. The valid address range is 0×0 h to 0×17 h (0-23) and the data transfer rate is 64 Kbps to 1.536 Mbps (in increments of 64 Kbps). The T1 field represents the T1 logical channels within a DS3 physical channel. The valid address range is 0×0 h to 0×1 Bh (0-27) and the data transfer rate is 1.544 Mbps to 43.232 Mbps (in increments of 1.544 Mbps). The DS3 field 702 represents the number of DS3 physical channels. The valid address range is 0×0 h to 0× Bh (0-11) and the data transfer rate is 44.736 Mbps. For example, the processor 214a and/or 214b derives the channel address for the channel number associated with the third DS3 channel (unchannelized) by putting the decimal value "2" (counting from zero and in binary format) in the DS3 field 602, putting the decimal value zero in the T1 field 604, and putting the decimal value zero in the DS0 field 606. This corresponds to the channel address 00 1000 0000 0000 (binary) or 0×0800 hex. As another example, the processor 214a and/or 214b derives the channel address for the channel number associated with the third T1 channel (unchannelized) in the second DS3 channel (channelized) by putting the decimal value "1" (counting from zero and in binary format) in the DS3 field 602, putting the decimal value "2" (counting from zero and in binary format) in the T1 field 604, and putting the decimal value zero in the DS0 field 606. This corresponds to the channel address 00 0100 0100 0000 (binary) or 0×0440 hex. In yet another example, the processor 214a and/or 214b derives the channel address for the channel number associated with the 7th DS0 channel in the 15th T1 channel (channelized) in the 12th DS3 channel (channelized) by putting the decimal value "11" (counting from zero and in binary format) in the DS3 field 602, putting the decimal value "14" in the T1 field 604, and putting the decimal value "6" in the DS0 field 606. This corresponds to the channel address 10110111000110 (binary) or 0×2DC6 hex.

FIG. 7 shows an embodiment of a format 700 for channel memory at each address of channel memory. The format 700 includes a channel memory provision (PROV) bit field 702 and a fourteen bit channel number field 704. The processor 214a and/or 214b stores a channel number in the channel memory in this format. The processor 214a and/or 214b stores the channel number in the channel number field 704 and the channel memory provision bit value, which indicates whether the channel is provisioned or unprovisioned, in the channel memory provision bit field 702. In one embodiment, a bit value of "1" in the provisional bit indicates that the channel is provisioned.

FIG. 8 shows an embodiment of the channel memory 800. In the embodiment shown, the channel memory 800 has 12152 address locations from 0×0000 to 0×2F77. Each address in the channel memory 800 includes a channel address field 802 and a channel number field 804. The values in the channel number field 804 (according to the format shown in FIG. 7) are the channel numbers and associated channel memory provision bits. The processor 214a and/or 214b stores these values in the channel memory 216a or 216b at the address locations shown in the address field 802. For example, a channel address of 0×0800 hex 806 in the channel address field 802 is the address of the channel number 808 and channel memory provision bit 814 in the channel number field 804 associated with the third DS3 channel. As another example, a channel address of 0×2DC6 hex 810 in the channel address field 802 is the address of the channel number 812 and channel memory provision bit 816 in the channel number field 804 associated with the seventh DS0 channel in the fifteenth T1 channel in the twelfth DS3 channel.

As previously described, the processor 214a and/or 214b periodically polls a channel (a physical or logical provisioned port with an assigned channel number) to determine if the channel has packets that need to be transferred, or if the channel is available to receive packets. Channel polling is necessary to match the data transfer rate (speed with which packets are transmitted from one device to another) and the link rate (actual transmission speed of the link) between a polling engine (such as the processors 214a, 214b for example) and a polled device (such as the I/O ports 204a, 204b, for example). If the data transfer rate and the link rate between the polling device and the polled device are not matched, channels may be underutilized. Further, packets may be lost or corrupted depending on the direction (input/output) of the packet flow and on whether the data transfer rate between the polling engine and the polled device is greater or less than the link rate. To prevent underutilization of the channel and data packets from being corrupted or lost, the processor 214a and/or 214b matches the channel's polling rate (rate at which a channel is read) to the channel's bandwidth (amount of packets a channel transmits/receives in a fixed amount of time). If the polling rate for a channel is too low (the channel is not polled enough), then the channel will be under-utilized. For example, a T1 channel that has a data transfer rate (bandwidth) of 1.544 Mbps (Megabits per second), becomes underutilized if not polled at a rate to achieve the 1.544 Mbps transfer rate. If the polling rate for one channel is too high (i.e., polled too often), another channel will consequently not be polled enough and hence be underutilized. Depending on how the polling engine transfers packets to/from the polled device, packets can be corrupted or lost during a transfer due to under-running. For example, the polling engine can transfer packets to/from channels as variable length packets. It is advantageous to transfer packets between the polling engine and the polled device in small portions. However, if the polling engine transfers a small portion of an entire packet to the polled device (e.g., channel) and then output onto the network before the polling engine polls the channel again and sends the rest of the packet, a gap in the data packet is introduced. According to typical channel protocols, gaps in packets should not occur. As a result of the gap in the packet, the receiving device cannot determine what the packet is.

The channel polling method described below facilitates matching of the polling rate and the bandwidth for a plurality of port types including DS3, multi-link T1, T1, fractional T1, and DS0s typically found in data communication and telecommunication applications. The polling method can be applied to any interfaces requiring high channel density, such as Pos-PHY2 and Utopia interfaces, for example. Typically, a system that utilizes the polling method is a system that terminates and/or generates a high number of individual channels to/from a common packet processor.

Referring to FIGS. 2, 4-8, 9A, and 9B, in one embodiment, in operation, the polling engine (e.g. processors 214a, 214b) examines the DS3 PROV bit 402 of one of the twelve (numbered 0-11) DS3 poll registers 400 (Step 902). If the DS3 PROV bit 402 of the DS3 poll register 400 is not set (i.e., value=0), the DS3 channel is not provisioned and the processor 214a and/or 214b selects the next DS3 register 400 (Step 904) and examines that DS3 register 400 (Step 902). If the DS3 PROV bit 402 is set (i.e., value=1), this indicates that the DS3 channel (or at least one channel within the DS3 channel) is provisioned, and the processor 214*a* and/or 214*b* examines the DS3 CHAN bit 404 (Step 906). If the DS3 CHAN bit 404 is not set (i.e., value=0), this indicates that the DS3 channel is not channelized. If the DS3 channel is provisioned, but not channelized, the processor 214*a* and/or 214*b* reads a channel number 802 from the channel memory 216*a* (or 216*b*) at a channel address corresponding to the particular DS3 register being examined (Step 908). For example, if the processor 214*a* and/or 214*b* reads the fourth DS3 poll register and the corresponding DS3 channel is provisioned, but not channelized, then the processor 214*a* and/or 214*b* reads the channel memory having a binary channel address of 00 1100 0000 0000 (or 0×0C00). The processor 214*a* and/or 214*b* also examines the valued stored in the PROV bit field 702 of the channel memory at the particular channel address (also Step 908). If the channel memory address PROV bit 702 is set, the processor 214*a* and/or 214*b* then polls the DS3 channel associated with the channel number 704 (Step 910). After the processor 214*a* and/or 214*b* polls the DS3 channel, the processor 214*a* and/or 214*b* selects the next DS3 register 400 (Step 904) and examines that DS3 register 400 (Step 902). If the channel memory PROV bit 702 is not set, the processor 214*a* and/or 214*b* selects the next DS3 poll register 400 (Step 904) and examines that DS3 poll register 400 (Step 902).

When both the DS3 PROV bit 402 and the DS3 CHAN bit 404 are set, the processor 214*a* and/or 214*b* reads and increments the T1 port count 406 (Step 912). The processors 214*a* and/or 214*b* uses the pre-incremented value (0-27) stored in the T1 port count 406 in conjunction with the particular DS3 register (0-11) 404 examined to point to the T1 poll register 500 that is to be examined (read) next. The processor 214*a* and/or 214*b* then examines the T1 PROV bit 502 of this T1 poll register 500 (Step 914). In one embodiment, the value in T1 port count 406 ranges from 0 to 27.

If the T1 port 500 is not provisioned (T1 PROV bit 502 not set), the processor 214*a* and/or 214*b* selects the next DS3 poll register 400 (Step 904) and examines that DS3 poll register 400 (Step 902). If the T1 port is provisioned, the processor 214*a* and/or 214*b* examines the T1 CHAN bit 504 (Step 916). If the T1 port is not channelized (T1 CHAN bit 504 not set), the processor 214*a* and/or 214*b* reads a channel number 704 from the channel memory 216*a* (or 216*b*) at the address corresponding to the T1 poll register 500 (Step 918). The processor 214*a* and/or 214*b* also examines the bit stored in the channel memory PROV bit field 702 of the channel memory 216*a* or 216*b* (also Step 918) at the channel address accessed in Step 918. If the channel memory PROV bit 702 is set, the processor 214*a* and/or 214*b* then polls the T1 port (Step 922). If the channel memory PROV bit 702 is not set, the processor 214*a* and/or 214*b* selects the next DS3 poll register 400 (Step 904) and examines that DS3 poll register 400 (Step 902).

If the T1 CHAN bit 504 is set, the T1 channel is channelized. When both the T1 PROV bit 502 and the T1 CHAN bit 504 are set, the processor 214*a* and/or 214*b* reads and increments the DS0 port count 506 (Step 920). The processor 214*a* and/or 214*b* uses the pre-incremented value (0-23) read from the DS0 port count 506 in conjunction with the T1 register queried (0-27) to form a channel address index into the channel memory 216*a* (or 216*b*) for the channel number to be polled (Step 924). In one embodiment, the value of the DS0 port count ranges from 0 to 23. The processor 214*a* and/or 214*b* also examines the channel memory PROV bit field 702 of the channel memory 216*a* (or 216*b*) (also Step 918) at the channel address accessed in Step 924. If the channel memory PROV bit 702 is set, the processor 214*a* and/or 214*b* then polls the DS0 port (Step 926). If the channel memory PROV bit 702 is not set, the processor 214*a* and/or 214*b* selects the next DS3 poll register 400 (Step 904) and examines that DS3 poll register 400 (Step 902).

Utilizing this polling method to poll channels results in the processor 214*a* and/or 214*b* polling each channel at a rate relative to the channel's bandwidth within a group of provisioned channels. A DS3 channel has a bandwidth of 44.736 Mbps. A T1 channel has a bandwidth of 1.544 Mbps or approximately 1/28th the bandwidth of a DS3 channel. A DS0 channel has a bandwidth of 64 Kbps, or approximately 1/24th the bandwidth of a T1 channel, or approximately 1/672th the bandwidth of a DS3 channel. Each of the twelve DS3 channels is polled every 12th time, each of the 28 T1 channels within a DS3 channel are polled every 12×28th time, and each of the 24 DS0 channels within a T1 channel are polled every 12×28×24th time. In other words, a T1 channel is polled 1/28th times as often as a DS3 channel and a DS0 channel is polled 1/24th times as often as a T1 channel, or 1/672th times as often as a DS3 channel.

To match a fractional or multilink T1 channel polling rate with the fractional or multilink T1 channel bandwidth, the processor 214*a* and/or 214*b* writes the fractional or multilink T1 channel number in n channel memory locations where n is the number of DS0 or T1 channels linked together in the fractional or multilink T1. For example, in a 2×DS0 fractional T1, n=2. When the processor 214*a* and/or 214*b* writes the channel number at two channel memory locations, the processor 214*a* and/or processor 214*b* polls that 2×DS0 fractional T1 channel twice as often as the processor 214*a* and/or 214*b* polls a single DS0 channel. This results in the processor 214*a* and/or 214*b* polling the fractional T1 at a rate of 2×1/672nd the rate that the processor 214*a* and/or 214*b* polls a DS3 channel.

By more efficiently matching a channel's polling rate to the channel's relative bandwidth, the processors 214*a*, 214*b* (or other device utilizing the channel polling method) can service more channels in a given amount of time without causing link errors such as channel under-runs, channel under-utilization, or dropped (lost) packets. .

Referring again to FIGS. 2, 4-6, and 8, in one embodiment, the processor 214*a* and/or 214*b* enables channels by only two write instructions and disable channels by only one processor write instruction. For example, the two processor write instructions that enable an unchannelized DS3 port (e.g., the entire port is one channel) are as follows: The first write instruction includes writing a "1" to the DS3 PROV bit location 402 and a "0" to the DS3 CHAN bit location 404. The T1 port count in location 406 of the DS3 channel poll register 400 is irrelevant (i.e., "don't care"). The second write instruction includes writing a channel number to particular channel address (in the channel memory 214*a* or 214*b*) and a "1" to the corresponding channel memory PROV bit 702. The processor 214*a* and/or 214*b* disables the unchannelized DS3 port by writing a "0" to the DS3 PROV bit location 402. The DS3 CHAN bit in location 404 and the T1 port count in location 406 of the DS3 channel poll register 400 are irrelevant (i.e., "don't care").

Enabling multiple channels in a multi-channel bundle includes two processor write instructions per each channel enabled in the multi-channel bundle as described in the previous example. Disabling multiple channels in a multi-channel bundle includes one processor write instruction per channel disabled in the multi-channel bundle.

Devices, such as a telecommunication switch, for example, that employ the channel polling method of the present invention require significantly less memory than devices that employ existing polling methods because the channel polling method of the present invention does not require separate active and update tables to enable and disable channels. Further, the channel polling method only requires two write instructions to enable or provision a channel, and one write instruction to disable or unprovision a channel. This is unlike existing polling methods, which can require up to 672 write instructions for both enabling and disabling channels.

Variations, modifications, and other implementations of what is described herein may occur to those of ordinary skill in the art without departing from the spirit and scope of the invention. Accordingly, the invention is not to be defined only by the preceding illustrative description.

What is claimed is:

1. A method for polling ports of a telecommunications device, the method comprising:
    (a) reading information from at least one of a plurality of poll registers, each of the plurality of poll registers corresponding to one of the ports and being associated with a unique identifier, wherein reading from the at least one of the plurality of poll registers comprises reading a provision bit, reading a channel bit in response to the provision bit indicating that the port corresponding to that poll register is provisioned, and reading a port count associated with another one of the plurality of poll registers in response to the channel bit indicating that the port is channelized;
    (b) reading, depending on the information read from the at least one poll register, a channel number representing the port to be polled from a location in channel memory determined from the unique identifier associated with the poll register from which the information is read, wherein reading the channel number further comprises reading the channel number and an associated provision bit from the location in channel memory determined from the unique identifier associated with the poll register in response to a channel bit indicating that the port is not channelized; and
    (c) polling the port represented by the read channel number.

2. The method of claim 1 further comprising reading the provision bit from the location in channel memory determined from the unique identifier.

3. The method of claim 2 wherein polling the channel represented by the read channel number occurs in response to the provision bit read from the location in channel memory indicating that the port is provisioned.

4. The method of claim 1 wherein reading information from the at least one of the plurality of poll registers further comprises reading a port count associated with another one of the plurality of poll registers in response to a provision bit indicating that the port is provisioned and a channel bit indicating that the port is channelized.

5. The method of claim 4 wherein reading the channel number comprises reading the channel number and an associated channel memory provision bit from a location in channel memory determined from the port count and the unique identifier associated with the poll register in response to the channel bit indicating the port is channelized.

6. The method of claim 1 wherein polling the channel represented by the read channel number comprises polling the channel represented by the read channel number in response to an associated provision bit from the location in channel memory indicating that the port is provisioned.

7. A method for enabling polling of a port of a telecommunications device, the method comprising:
    writing a first value to a location in channel memory, the first value identifying a port to be polled, wherein writing the first value to the location in channel memory comprises setting a channel memory provision bit and writing a channel number to the channel memory at the location; and
    writing a second value to a register associated with the port to be polled, the second valued enabling access to the location in the channel memory from which the first value can be retrieved in order to poll the port, wherein writing the second value to the register associated with the port to be polled comprises writing a register provision bit and a register channel bit to the register.

8. A telecommunications device having a plurality of ports, the ports having a plurality of types, each type of port handling network data at a different bandwidth than the other types of ports, the telecommunications device comprising:
    channel memory organized by channel addresses, the channel memory at each channel address storing a channel number that corresponds to one of the ports;
    a plurality of registers each associated with a type of port; and
    a processor determining a particular one of the ports to be polled by deriving a channel address from at least one of the registers and obtaining a channel number of the particular port from the channel memory located at the derived channel address;
    the processor reading information from at least one of the plurality of registers, each of the plurality of registers corresponding to one of the ports and being associated with a unique identifier, wherein reading from the at least one of the plurality of registers comprises reading a provision bit, reading a channel bit in response to the provision bit indicating that the port corresponding to that register is provisioned, and reading a port count associated with another one of the plurality of registers in response to the channel bit indicating that the port is channelized; and
    the processor reading, depending on the information read from the at least one register, the channel number representing the port to be polled from a location in channel memory determined from the uniciue identifier associated with the register from which the information is read, wherein reading the channel number further comprises reading the channel number and an associated provision bit from the location in channel memory determined from the unique identifier associated with the register in response to a channel bit indicating that the port is not channelized.

* * * * *